United States Patent Office 3,153,664
Patented Oct. 20, 1964

3,153,664
S-(3-ALKYLMERCAPTO 2-HALO PROPYL) AND S-(3-ALKYLMERCAPTO 2-HALO PROPENYL) ESTERS OF PENTAVALENT PHOSPHORUS ACIDS
Hans-Gerd Schicke, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Aug. 22, 1962, Ser. No. 218,506
Claims priority, application Germany Sept. 6, 1961
11 Claims. (Cl. 260—461)

The present invention relates to and has as its objects new and useful insecticidal (di)thiophosphoric acid esters and processes for their production. Generally the new compounds of this invention may be represented by the following formula

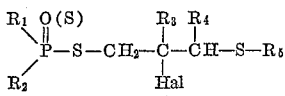

in which $R_1$ and $R_2$ denote aliphatic or aromatic residues which are linked to the phosphorus atom either directly or via oxygen, $R_3$ and $R_4$ represent hydrogen or another C—C bond, whilst $R_5$ signifies an alkyl radical and Hal a halogen atom, preferably chlorine.

O,O-dialkyl-S-propargyl-thio- or -dithiophosphoric acid esters of the general formula

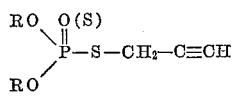

wherein R represents, preferably lower, alkyl residues, have already been described in German patent specification 1,063,148.

In accordance with the above mentioned German patent specification these compounds are characterized by good insecticidal activity towards Colorado beetles, flies, greenflies, spider mites, and mosquito larvae, and in part they possess systemic properties.

In accordance with this invention it has now been found that compounds of the above inventive composition, which are also highly effective as insecticides, can be obtained by addition of optionally substituted alkyl- or arylsulfenic acid halides to alkenyl- or alkynyl-thio- or dithiophosphoric (-phosphonic, -phosphinic) acid esters of the formula

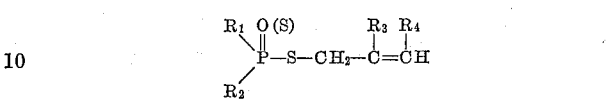

in which the symbols have the same significance as given above.

The reaction in accordance with the process can be explained by means of the following reaction sequence:

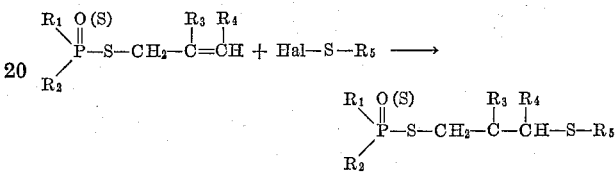

where again the residues $R_1$ to $R_5$ possess the significance specified above.

The process according to the invention is preferably carried out at room temperature or at a lower temperature, and in the presence of inert organic solvents. Among the latter, halogenated hydrocarbons such as methylene chloride, chloroform, 1,2-dichloroethane, and carbon tetrachloride have proved particularly suitable.

It has also been found that the compounds obtainable according to the process possess a considerably increased insecticidal activity compared with the alkenyl- or alkynyl-thio- or dithiophosphoric (-phosphonic, -phosphinic) acid esters to be employed as starting materials; these unexpected, technically valuable properties of the products of the process are evident from the following comparison:

| Product | Appl. against— | Biological activity | |
|---|---|---|---|
| | | Conc. of active agent (percent) | Destruction of pests (percent) |
| $(C_2H_5O)_2\overset{S}{\overset{\|}{P}}-S-CH_2-CH=CH_2$ | Greenflies<br>Spider mites<br>Fly maggots | 0.1<br>0.1<br>0.1 | 0<br>0<br>90 |
| $(C_2H_5O)_2\overset{S}{\overset{\|}{P}}-S-CH_2-C\equiv CH$ | Greenflies<br>Spider mites<br>Fly maggots | 0.1<br>0.1<br>0.1 | 60<br>95<br>100 |
| $(C_2H_5O)_2\overset{S}{\overset{\|}{P}}-S-CH_2-\overset{Cl}{\overset{\|}{C}H}-CH_2-SC_2H_5$ | Greenflies<br>Spider mites<br>Fly maggots | 0.1<br>0.01<br>0.001 | 100<br>100<br>50 |
| $(iC_3H_7O)_2\overset{S}{\overset{\|}{P}}-S-CH_2-CH=CH_2$ | Greenflies<br>Spider mites | 0.1<br>0.1 | 0<br>40 |
| $(iC_3H_7O)_2\overset{S}{\overset{\|}{P}}-S-CH_2-C\equiv CH$ | Greenflies<br>Spider mites | 0.1<br>0.1 | 0<br>0 |
| $(iC_3H_7O)_2\overset{S}{\overset{\|}{P}}-S-CH_2-\overset{Cl}{\overset{\|}{C}H}-CH_2-SC_2H_5$ | Greenflies<br>Spider mites | 0.01<br>0.1 | 100<br>100 |
| $\underset{C_2H_5O}{\overset{C_2H_5}{\diagdown}}\overset{S}{\overset{\|}{P}}-S-CH_2-CH=CH_2$ | Greenflies<br>Spider mites | 0.1<br>0.1 | 95<br>98 |
| $\underset{C_2H_5O}{\overset{C_2H_5}{\diagdown}}\overset{S}{\overset{\|}{P}}-S-CH_2-C\equiv CH$ | Greenflies<br>Spider mites | 0.1<br>0.1 | 100<br>100 |

| Product | Biological activity | | |
|---|---|---|---|
| | Appl. against— | Conc. of active agent (percent) | Destruction of pests (percent) |
| 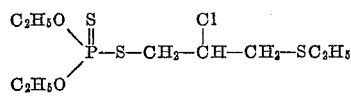 | Greenflies | 0.01 | 100 |
| | Spider mites (ovicidal activity.) | 0.01 | 100 |
| $(C_2H_5)_2\overset{\overset{S}{\|}}{P}$—S—CH$_2$—CH=CH$_2$ | Greenflies | 0.1 | 40 |
| | Spider mites | 0.1 | 50 |
| $(C_2H_5)_2\overset{\overset{S}{\|}}{P}$—S—CH$_2$—C≡CH | Greenflies | 0.1 | 50 |
| | Spider mites | 0.1 | 100 |
| 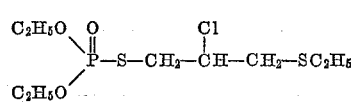 | Greenflies | 0.1 | 100 |
| | Spider mites | 0.01 | 100 |

By virtue of this excellent insecticidal activity, the thiophosphoric (-phosphonic, -phosphinic) or dithiophosphoric (-phosphonic, -phosphinic) acid esters according to the invention are applicable as pest control agents, particularly for plant protection.

The application of the products of the process for the stated purpose is carried out by the normal method for insecticides based on phosphoric acid esters, i.e. preferably in combination with solid or liquid extenders or diluents. Examples of solid extenders are talc, chalk, bentonite, alumina, kaolin, and the like, whilst water is principally employed for the preparation of liquid formulations. Since the compounds according to the invention are very largely insoluble in water, however, the application of a solubilizing assistant, e.g. dimethylformamide or acetone, and also of a commercial emulsifying agent, is recommended in such a case.

The following examples are given for the purpose of illustrating the present invention.

Example 1

$$\begin{array}{c}C_2H_5O\\\phantom{xx}\diagdown\overset{S}{\underset{\|}{P}}\\C_2H_5O\diagup\phantom{xx}\end{array}\!\!-S-CH_2-\overset{\overset{Cl}{|}}{C}H-CH_2-SC_2H_5$$

68 grams (0.3 mol) of O,O-diethylthionothiolphosphoric acid-S-propenyl-(2)-ester are dissolved in 100 cc. of carbon tetrachloride. 29 grams of ethylsulfenic acid chloride, dissolved in 100 cc. of carbon tetrachloride, are then added dropwise to this solution at 0° C., the mixture is thereafter stirred for another 30 minutes, washed with water, the organic phase dried, and the solvent distilled off. The yield amounts to 82 grams, corresponding to 85% of the theoretical. The O,O-diethylthiono-thiolphosphoric acid - S - (2-chloro-3-ethyl-mercaptopropyl)-ester is obtained in the form of an almost colorless oil.

*Analysis.*—Calculated for a molecular weight of 322: P, 9.63%; S, 29.8%; Cl, 11.01%. Found: P, 9.53%; S, 29.68%; Cl, 10.80%.

Example 2

$$\begin{array}{c}C_2H_5O\\\phantom{xx}\diagdown\overset{O}{\underset{\|}{P}}\\C_2H_5O\diagup\phantom{xx}\end{array}\!\!-S-CH_2-\overset{\overset{Cl}{|}}{C}H-CH_2-SC_2H_5$$

0.3 mol of ethylsulfenic acid chloride, dissolved in 200 cc. of carbon tetrachloride, are added dropwise at 10° C. to a solution of 63 grams (0.3 mol) of O,O-diethylthiophosphoric acid-S-propenyl-(2)-ester in 200 cc. of carbon tetrachloride, and the mixture is thereafter stirred at 20° C. for another hour. The resultant colorless solution is then washed with water, and dried. When the solvent has been distilled off, the O,O-diethylthiolphosphoric acid-S-(2-chloro-3-ethylmercaptopropyl)-ester remains as an oil with a pale yellow color. The yield amounts to 83 grams, corresponding to 90% of the theoretical.

*Analysis.*—Calcaluted for a molecular weight of 306.5: P, 10.12%; S, 20.9%; Cl, 11.6%. Found: P, 9.98%; S, 21.05%; Cl, 11.38%.

Example 3

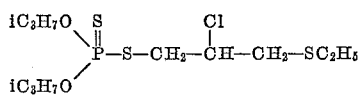

38 grams (0.15 mol) of O,O-diisopropylthionothiolphosphoric acid-S-propenyl-(2)-ester are dissolved in 200 cc. of carbon tetrachloride; this solution is treated dropwise at 0 to 5° C. with 0.15 mol of ethylsulfenic acid chloride dissolved in 75 cc. of carbon tetrachloride, the mixture is thereafter stirred at 20° C. for another hour, and then washed with water. After the organic phase has been dried over sodium sulfate, the solvent is removed in vacuum. There remain 45 grams (86% of the theoretical) of O,O - diisopropylthionothiolphosphoric acid-S-(2-chloro-3-ethylmercaptopropyl)-ester in the form of an almost colorless oil.

*Analysis.*—Calculated for a molecular weight of 350.5: P, 8.86%; S, 27.4%; Cl, 10.12%. Found: P, 9.35%; S, 27.02%; Cl, 9.10%.

Example 4

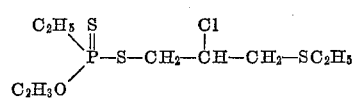

31.5 grams (0.15 mol) of ethylthionothiolphosphonic acid-O-ethyl-S-propenyl-(2)-ester are dissolved in 200 cc. of carbon tetrachloride. 0.15 mol of ethylsulfenic acid chloride dissolved in 75 cc. of carbon tetrachloride, are added to this solution at 0 to 5° C., the reaction mixture is stirred at 20° C. for another hour, then washed with water, the organic layer is dried, and the solvent is removed in vacuum. There are obtained 43 grams (94% of the theoretical) of ethylthionothiolphosphonic acid-O-ethyl-S-(2-chloro-3-ethylmercaptopropyl)-ester as an almost colorless oil.

*Analysis.*—Calculated for a molecular weight of 306.5: P, 10.12%; S, 31.4%; Cl, 11.6%. Found: P, 11.11%; S, 31.5%; Cl, 10.57%.

By the same way but using ethylsulfenic acid bromide instead of the corresponding chloride there may be obtained the following compound

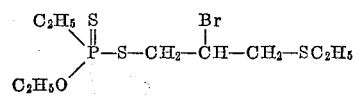

Example 5

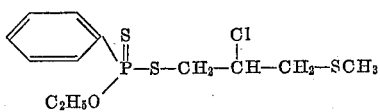

0.15 mol of methylsulfenic acid chloride, dissolved in 75 cc. of carbon tetrachloride, are added dropwise at 0 to 5° C. to a solution of 25.8 grams (0.1 mol) of phenyl-thionothiolphosphonic acid-O-ethyl-S-propenyl-(2)-ester, and the reaction mixture is worked up as described in the preceding examples. There are obtained 32 grams (94% of the theoretical) of phenylthionothiol-phosphonic acid-O-ethyl-S-(2-chloro-3-methyl-mercaptopropyl)-ester.

*Analysis.*—Calculated for a molecular weight of 340.5: P, 9.13%; Cl, 10.43%. Found: P, 9.99%; Cl, 9.60%.

Example 6

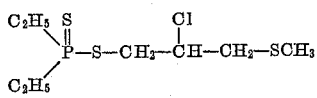

A solution of 19.4 grams (0.1 mol) of diethylthiono-thiolphosphinic acid-S-propenyl-(2)-ester in 150 cc. of carbon tetrachloride is treated dropwise at 0 to 5° C. with 8.25 grams (0.1 mol) of methyl-sulfenic acid chloride dissolved in 50 cc. of carbon tetrachloride. The reaction mixture is worked up as described in Examples 1 to 4, and there are obtained 24 grams (87% of the theoretical) of diethylthionothiolphosphinic acid-S-(2-chloro-3-methyl-mercapto-propyl) ester in the form of a pale yellow oil.

*Analysis.*—Calculated for a molecular weight of 276.5: P, 11.25%; S, 34.80%; Cl, 12.88%. Found: P, 11.18%; S, 34.46%; Cl, 12.89%.

Example 7

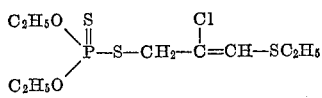

67 grams (0.3 mol) of O,O-diethylthionothiolphosphoric acid-S-propynyl-(2)-ester are dissolved in 100 cc. of carbon tetrachloride. 29 grams (0.3 mol) of ethyl-sulfenic acid chloride dissolved in 100 cc. of carbon tetrachloride are added dropwise to this solution, the mixture is thereafter stirred at room temperature for another hour, then washed with water, the organic phase dried, and the solvent distilled off in vacuum at a bath temperature of 30 to 40° C. The yield of O,O-diethylthionothiolphosphoric acid-S-(2-chloro-3-ethyl-mercaptopropenyl)-ester amounts to 88 grams (92% of theoretical).

*Analysis.*—Calculated for molecular weight of 320: P, 9.7%; S, 30.0%; Cl, 11.1%. Found: P, 9.73%; S, 30.05%; Cl, 10.78%.

Example 8

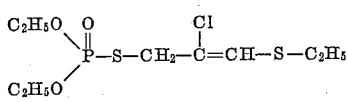

0.3 mol of ethylsulfenic acid chloride dissolved in 200 cc. of carbon tetrachloride are added dropwise at 10° C. to a solution of 62.5 grams (0.3 mol) of O,O-diethylphosphoric acid-S-propynyl-(2)-ester in 200 cc. of carbon tetrachloride, the reaction mixture is subsequently stirred at 20° C. for another hour, then washed with water, and after the organic phase has been dried over sodium sulfate, the solvent is removed in vacuum. There are obtained 60 grams (66% of the theoretical) of O,O-diethylthiolphosphoric acid - S - (2 - chloro-3-ethylmercaptopropenyl)-ester in the form of a yellow oil.

*Analysis.*—Calculated for a molecular weight of 305.5: P, 10.15%; S, 21.0%; Cl, 11.63%. Found: P, 10.33%; S, 20.97%; Cl, 10.92%.

Example 9

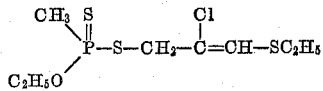

29 grams (0.15 mol) of methyl-thionothiolphosphonic acid-O-ethyl-S-propynyl-(2) ester are dissolved in 200 cc. of carbon tetrachloride, 0.15 mol of ethylsulfenic acid chloride dissolved in 75 cc. of carbon tetrachloride are added dropwise at 0 to 5° C. to this solution, and the reaction mixture is worked up as described in the preceding example. The yield amounts to 36 grams (83% of the theoretical).

*Analysis.*—Calculated for a molecular weight of 290.5: P, 10.7%; Cl, 12.25%. Found: P, 10.6%; Cl, 11.80%.

Example 10

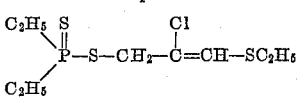

A solution of 0.15 mol of ethylsulfenic acid chloride in 75 cc. of carbon tetrachloride is added dropwise at 0 to 5° C. to a solution of 29 grams of diethylthionothiolphosphinic acid-S-propynyl-(2) ester in 200 cc. of carbon tetrachloride, the reaction mixture is thereafter worked up as described in the preceding examples, and there are obtained 36 grams (83% of the theoretical) of diethylthionothiolphosphinic acid - S - (2 - chloro-3-ethylmercaptopropenyl)-ester in the form of a yellow oil.

*Analysis.*—Calculated for molecular weight of 288.5: P, 11.08%; S, 34.3%. Found: P, 10.71%; S, 34.89%.

We claim:

1. A compound of the formula

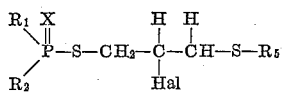

wherein $R_1$ is lower alkyl having up to 4 carbon atoms, $R_2$ is lower alkoxy having up to 4 carbon atoms, $R_5$ is lower alkyl having up to 4 carbon atoms, Hal stands for a member selected from the group consisting of bromo and chloro and X stands for a member selected from the group consisting of oxygen and sulfur.

2. A compound of the formula

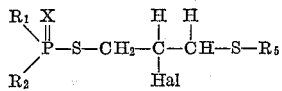

wherein $R_1$ and $R_2$ are each lower alkyl having up to 4 carbon atoms, $R_5$ is lower alkyl having up to 4 carbon atoms, Hal stands for a member selected from the group consisting of bromo and chloro and X stands for a member selected from the group consisting of oxygen and sulfur.

3. A compound of the formula

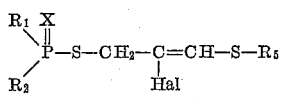

wherein $R_1$ and $R_2$ stand for a member selected from the group consisting of lower alkyl having up to 4 carbon atoms and lower alkoxy having up to 4 carbon atoms, and phenyl, and $R_5$ stands for lower alkyl having up to 4 carbon atoms, Hal stands for a member selected from the group consisting of chloro and bromo, and X stands for a member selected from the group consisting of oxygen and sulfur.

4. The compound of the following formula

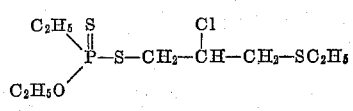

5. The compound of the following formula

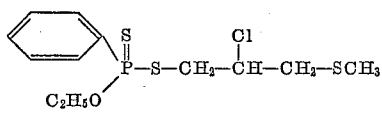

6. The compound of the following formula

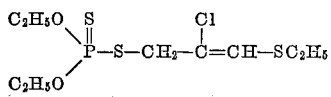

7. The compound of the following formula

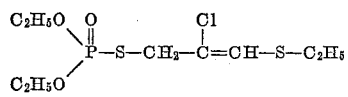

8. The compound of the following formula

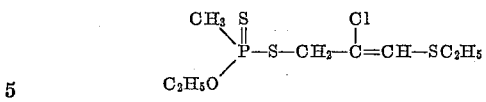

9. A compound of claim 2 wherein $R_1$ and $R_2$ are each lower alkoxy having up to 4 carbon atoms.

10. A compound of claim 2 wherein $R_1$ is lower alkyl having up to 4 carbon atoms and $R_2$ is lower alkoxy having up to 4 carbon atoms.

11. A compound of claim 2 wherein $R_1$ and $R_2$ are each lower alkyl having up to 4 carbon atoms.

References Cited in the file of this patent

UNITED STATES PATENTS

| | | |
|---|---|---|
| 2,952,700 | Lorenz et al. | Sept. 13, 1960 |
| 2,976,309 | Schrader | Mar. 21, 1961 |

FOREIGN PATENTS

| | | |
|---|---|---|
| F15647 | Germany | Feb. 23, 1956 |
| F16085 | Germany | Feb. 23, 1956 |